United States Patent
Ohtomo et al.

(10) Patent No.: US 7,148,958 B2
(45) Date of Patent: Dec. 12, 2006

(54) METHOD AND SYSTEM FOR MEASURING HEIGHT OR RELATIVELY AXIAL POSITION

(75) Inventors: Fumio Ohtomo, Tokyo (JP); Kunihiro Hayashi, Tokyo (JP); Makoto Ohmori, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 242 days.

(21) Appl. No.: 10/963,099

(22) Filed: Oct. 12, 2004

(65) Prior Publication Data
US 2005/0099617 A1  May 12, 2005

(30) Foreign Application Priority Data
Oct. 14, 2003 (JP) ............................. 2003-354168

(51) Int. Cl.
*G01B 11/26* (2006.01)
*G01C 5/00* (2006.01)
*G01C 3/08* (2006.01)

(52) U.S. Cl. ................. 356/141.3; 356/3.12; 356/5.01; 356/141.2

(58) Field of Classification Search ............... 356/4.01, 356/5.01, 138, 139.1, 141.2–141.4, 3.1, 3.12, 356/622, 623
See application file for complete search history.

(56) References Cited

U.S. PATENT DOCUMENTS 5,051,934 A * 9/1991 Wiklund ................... 356/152.3
5,100,229 A * 3/1992 Lundberg et al. ........... 356/3.12
5,579,102 A   11/1996 Pratt et al.
6,473,167 B1 * 10/2002 Odell ....................... 356/141.4
6,563,574 B1 *  5/2003 Ohtomo et al. ............ 356/141.1
2002/0060788 A1 *  5/2002 Ohtomo et al. ............ 356/139.1

FOREIGN PATENT DOCUMENTS

| EP | 0 950 874 A2 | 10/1999 |
| JP | 2002-039755 | 2/2002 |
| WO | WO 92/03701 | 3/1992 |

* cited by examiner

Primary Examiner—Thomas H. Tarcza
Assistant Examiner—Isam Alsomiri
(74) Attorney, Agent, or Firm—Chapman and Cutler LLP

(57) ABSTRACT

A pair of rotary laser devices are vertically arranged while aligning their respective axes into a single axis and keeping said rotary laser devices away from each other in an axial direction thereof by a predetermined interval, and a light-receiving sensor is kept radially away from the single axis. A plurality of fan-shaped laser beams are emitted from each of the rotary laser devices, while rotating the laser beams. The laser beams include at least one fan-shaped laser beam in a plane inclined to a plane containing said single axis. The laser beams are received and detected with the light-receiving sensor. Inclinations of the rotary laser devices are determined relative to the light-receiving sensor, respectively, based on time intervals of said detection of the laser beams, and the position of the sensor are determined relative to said pair of the rotary laser devices in the axial direction.

18 Claims, 9 Drawing Sheets

METHOD AND SYSTEM FOR MEASURING HEIGHT OR RELATIVELY AXIAL POSITION

BACKGROUND OF THE INVENTION (1) Field of the Invention

The present invention relates to a method and a system in which a height position of a light-receiving sensor is measured, while the light-receiving sensor detects laser beams which are radiating from a laser light source under rotation.

(2) Related Art Statement

Kabushiki Kaisha Topcon formerly proposed a height-measuring system in which a plurality of fan-shaped laser beams are irradiated from a light-emitting section of a rotary laser device, said laser beams comprising at least one fan-shaped laser beam extending in a plane inclined to a plane containing a rotary axis of the light-emitting section, each of said plurality of the fan-shaped laser beams from the light-emitting section is detected by a light-receiving section of a light-receiving sensor, and an angle of elevation as a crossing angle between a line connecting the light-emitting section and the light-receiving section and a horizontal reference line is measured based on detection time intervals of the respective fan-shaped laser beams. See JP-A1 2002-39755, pages 4 to 6, FIGS. 1 to 4, for example.

According to this height-measuring system, any arbitrary inclined face and a horizontal standard face of any arbitrary height can be defined without need of inclining a laser projector as the light-emitting section or finely locating a light receiver as the light-receiving section. Thus, such a height-measuring system can be used for the formation of a horizontal reference line to determining a position of a window frame in an interior work of a housing or building or for the formation of a horizontal reference plane to construct a cut ground face after building an embankment in a civil engineering work, for example. Thereby, such works can be easily and effectively performed.

SUMMARY OF THE INVENTION

It is an object of the present invention to provide a height-measuring method and a height-measuring system for enabling an easier and accurate height measurement by utilizing a technique of emitting at least two fan-shaped laser beams from a light-emitting section of a rotary laser device, detecting the laser beams each in the fan shape from the light-emitting section with a light-receiving sensor and determining an angle of elevation between the light-emitting section and the light-receiving section and a horizontal standard line.

The height-measuring or a relatively axial position-measuring method according to the present invention comprising vertically arranging a pair of rotary laser devices while aligning their respective axes into a single axis and keeping said rotary laser devices away from each other in an axial direction thereof by a predetermined interval, arranging a light-receiving sensor while keeping said sensor radially away from said single axis, emitting a plurality of fan-shaped laser beams from each of the rotary laser devices while rotating laser beams, said laser beams comprising at least one fan-shaped laser beam in a plane inclined to a plane containing said single axis, receiving and detecting the laser beams with the light-receiving sensor, determining inclinations of the rotary laser devices relative to the light-receiving sensor, respectively, based on time intervals of said detection of the laser beams, and detecting the position of the sensor relative to said pair of the rotary laser devices in the axial direction.

In the following, preferred embodiments (1) to (7) of the height-measuring method according to the present invention will be recited. Any combinations thereof will be deemed as preferred ones so long as there are no contradictions therefor.

(1-1) Said plurality of fan-shaped laser beams are emitted from a light-emitting section of each of the rotary laser devices while said rotation of said pair of the rotary laser devices around said single axis is so performed that said plurality of the laser beams from each of the rotary laser devices may scan a predetermined angular range around said single axis, said plurality of the laser beams from each of the rotary laser device are received and detected by a light-receiving section of the light-receiving sensor with time lags, intersecting angles between a horizontal reference plane and lines connecting the respective light-emitting sections to the light-receiving section are determined based on the detection time intervals with respect to the respective light-emitting sections, and a height of the light-receiving section from a ground level above which the rotary laser devices are arranged is determined based on said intersecting angles and information of heights of the respective rotary laser devices from the ground level.

(1-2) Said light-receiving sensor is arranged on a support pole installed on a ground, and a level difference between the said ground level and the ground on which is installed the support pole is calculated based on additional information of the known height of said light-receiving section from the ground and information of the determined height of the light-receiving-section from the ground above which the rotary laser devices are placed.

(1-3) The support pole is provided with an inclination detector adapted to detect an inclination of the support pole to a perpendicular line within a plane containing the support pole and the rotary laser devices, and said height or said level difference from said ground level above which the rotary laser devices are placed is corrected based on an inclination detection signal from the inclination detector.

(1-4) The polarized direction of the laser beams from one of the rotary laser devices is different from that of the laser beams from the other to discriminate the laser beams of one of the rotary laser devices from those of the other.

(1-5) The laser beams from at least one of the rotary laser devices are modulated to discriminate the laser beams of one of the rotary laser devices from those of the other.

(1-6) The wavelength of the laser beams from one of the rotary laser devices is different from that of the laser beams from the other to discriminate the laser beams of one of the rotary laser devices from those of the other.

(1-7) A GPS (Global Positioning System) to detect an absolute position of the light-receiving sensor is mounted on the light-receiving sensor, and the absolute position determined by the GPS is displayed.

The present invention also relates to a system for measuring a height or position in an axial direction, said system comprising a pair of rotary laser devices vertically arranged while their respective axes being aligned into a single axis and said rotary laser devices being kept away from each other in an axial direction thereof by a predetermined interval, and a light-receiving sensor arranged while said sensor being kept radially away from said single axis, wherein a plurality of fan-shaped laser beams are emitted from each of the rotary laser devices while said pair of the rotary laser devices are rotated around said single axis, said plurality of the laser beams comprising at least one fan-shaped laser beam in a plane inclined to a plane containing said single axis, the light-receiving section receives and detects said laser beams, inclinations of the rotary laser devices is detected relative to the light-receiving sensor, respectively, based on time intervals of said detection of the laser beams, and the position of the sensor is detected relative to said pair of the rotary laser devices in the axial direction.

In the following, preferred embodiments (1) to (9) of the height-measuring system according to the present invention will be recited. Any combinations thereof will be deemed as preferred ones so long as there are no contradictions therefor.

(2-1) Based on the detection of the inclinations of the rotary laser devices, a distances of the light-receiving sensor from the rotary laser devices as well as the relative position of the light-receiving sensor in the axial direction to said pair of the rotary laser devices can be calculated.

(2-2) Each of the rotary laser devices comprises a light-emitting section to emit said plurality of fan-shaped laser beams while said rotation of said pair of the rotary laser devices around said single axis is so performed that said plurality of the laser beams from each of the rotary laser devices may scan a predetermined angular range around said single axis, the light-receiving sensor comprises a light-receiving section to receive and detect said plurality of the laser beams from each of the rotary laser devices with time lags, the height-measuring system further comprises an arithmetic unit, respective heights of the light-emitting sections from a ground level above which the rotary laser devices are installed are different from each other, the laser beams from one light-emitting section are discriminative from those from the other light-emitting section, the light-receiving sensor determines intersecting angles between a horizontal reference plane and lines connecting the respective light-emitting sections to the light-receiving section based on detection information of the respectively discriminative laser beams emitted from the respective rotary laser devices, and the arithmetic unit determines the heights of the light-receiving sections form the ground level based on information of said intersecting angles and respectively known heights of the light-receiving sections.

(2-3) The height-measuring system further comprises a setter for setting a desired height for said light-receiving sensor, and a display unit for making a display when the determined height of the light-receiving sensor-from said ground level is in conformity with said desired value.

(2-4) The height-measuring system comprises a support pole on which said light-receiving sensor is placed and which is installed on a ground, wherein said arithmetic unit calculates a difference in level between the ground level on which the rotary laser devices are installed and the ground on which the pole is placed, based on information of the known height of the light-receiving section from the ground level on which the pole is installed and the determined height of the light-receiving section from the ground level above which the rotary laser devices are installed.

(2-5) The support pole is provided with an inclination detector adapted to detect an inclination of the support pole to a perpendicular line within a plane containing the support pole and the rotary laser devices, and the arithmetic unit corrects said height of the light-receiving section from the ground level above which the rotary laser devices are installed or said level difference is based on an inclination detection signal from the inclination detector.

(2-6) The light-receiving sensor comprises a GPS (Global positioning system) for detecting an absolute position of the light-receiving sensor, and the display unit displays the absolute position obtained by the GPS.

(2-7) The polarized direction of the laser beams from one of the rotary laser devices is different from that of the laser beams from the other to discriminate the laser beams of one of the rotary laser devices from those of the other.

(2-8) The laser beams from at least one of the rotary laser devices are modulated to discriminate said laser beams from one of the rotary laser devices from those of the other.

(2-9) The wavelength of the laser beams from one of the rotary laser devices is different from that of the laser beams from the other to discriminate the former from the latter.

According to the height-measuring method and system of the present invention, a pair of the rotary laser devices are vertically arranged, while aligning their respective axes into the single axis and keeping said rotary laser devices away from each other in an axial direction thereof by a predetermined interval, the light-receiving sensor is arranged while keeping said sensor radially away from said single axis, a plurality of the fan-shaped laser beams are emitted from each of the rotary laser devices while rotating said pair of the rotary laser devices around said single axis, said laser beams comprising at least one fan-shaped laser beam in a plane inclined to a plane containing said single axis, the laser beams are received and detected with the light-receiving sensor, the inclinations of the rotary laser devices are determined relative to the light-receiving sensor, respectively, based on time intervals of said detection of the laser beams, and the position of the sensor is determined relative to said pair of the rotary laser devices in the axial direction. Thus, the axial position of the sensor can be easily determined relative to said pair of the rotary laser devices.

According to the preferred embodiments (1-2) and (2-2) of the present invention, the light-receiving sensor detecting the fan-shaped laser beams from the light-emitting sections of the rotary laser devices determines the intersecting angles between the horizontal reference plane and the lines connecting the respective light-emitting sections to the light-receiving section based on detection information or the detection time intervals of the plurality of the fan-shaped laser beams from the light-emitting sections, and the height of the light-receiving section from the ground level above which the rotary laser devices are arranged is determined based on said intersecting angles and information of the known heights of the respective rotary laser sections. Thus, the height position of the light-receiving section from the ground level can be easily grasped depending upon vertical movement of the light-receiving section along the perpendicular line.

According to the preferred embodiment (2-1) of the present invention, the distances from the rotary laser devices to the light-receiving sensor can be calculated together with the relatively axial position of the light-receiving sensor.

According to the preferred embodiments (1-2) and (2-4) of the present invention, the level difference between the ground level above which the rotary laser devices are installed and the ground on which is installed the support pole is calculated based on information of the known height of said light-receiving section of the light-receiving sensor from the ground on which the support pole is installed and information of the determined height of the light-receiving-section from the ground above which the rotary laser devices are placed. Thus, the level or height difference between the ground level and the ground on which the support pole is installed can be easily and accurately measured.

According to the preferred embodiments (1-3) and (2-5) of the present invention, the error due to the inclination of the support pole on which the light-receiving sensor is arranged can be corrected to enable the measurement of the height at high accuracy.

According to the preferred embodiments (1-4) to (1-6) and (2-7) to (2-9) of the present invention, since the laser beams from one rotary laser device can be assuredly discriminated from those from the other, erroneous operation due to erroneous detections of the laser beams from the rotary laser devices can be assuredly prevented.

According to the preferred embodiment (2-3) of the present invention, since the display unit can make indication through visually, aurally or the like when the determined height of the light-receiving sensor from said ground level is in conformity with the set desired value. Thus, a position of the desired height can be accurately known by confirming the displaying of the display unit while vertically moving the light-receiving device.

According to the preferred embodiment (2-6), the absolute position can be measured by the GPS at high accuracy in addition to the high-accuracy height measurement.

According to the present invention, the height of the light-receiving section of the light-receiving sensor can be accurately measured without inclining the laser projectors as the light-emitting sections or finely locating the position of the light-receiving section of the light-receiving sensor. Thus, the present invention can be applied to the formation of a horizontal reference line for determining positions of widow frames in interior works of buildings and housings, the formation of cut land faces after filling earth in civil engineering works, etc. The present invention can enables such works to be easily and effectively done.

BRIEF DESCRIPTION OF THE DRAWINGS

For a better understanding of the invention, reference is made to the attached drawings, wherein.

PREFERRED EMBODIMENTS OF THE INVENTION

Figure 1:
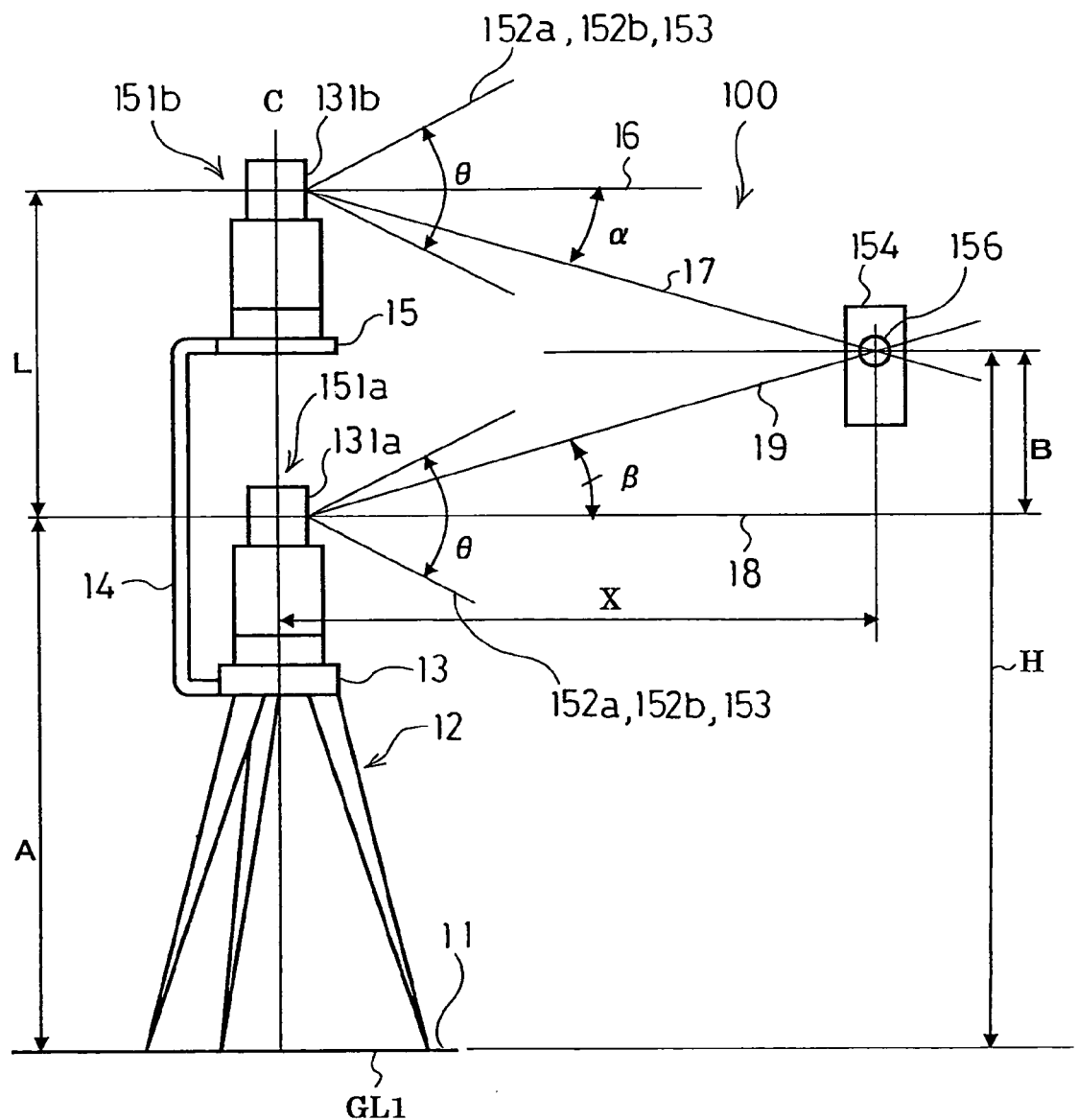
FIG. 1 is a view illustrating an outer appearance view of a first embodiment of a height-measuring system according to the present invention.

The present invention will be explained in more detail along with embodiments shown in the attached drawings.

First Embodiment

A first embodiment of the height-measuring system 100, which is adapted for performing the height-measuring method according to the present invention, comprises a pair of rotary laser devices 151a and 151b, and a light-receiving sensor 154 for receiving laser beams from both the rotary laser devices. On of the rotary laser devices, 151a, is provided on a base 13 of a tripod stand 12 placed on ground 11 of a ground level GL1. The other rotary laser device 151b is placed on another base 15 held above the base 13 via a C-letter shaped stay 14. Each of the rotary laser devices 151a and 151b emit fan-shaped laser beams as mentioned later through each of light-transmitting windows 131a, 131b as respective light-emitting sections thereof over an angular range of 0 to 360.

The light-receiving sensor 154 has its light-receiving section 156 directed toward the rotary laser devices 151a and 152b at a height-measuring point such that the light-receiving section may receive laser beam from each of the light-emitting sections 131a and 131b of the rotary laser devices 151a and 151b, respectively.

In the above measuring system 100, a distance from the ground level GL1 of the ground 11 to the light-emitting section 132 of one rotary laser device 151a, that is, the height A from the ground level GL1 to the light-emitting section 131a is known. On the other hand, a distance L between the light-emitting sections 131a and 131b of the rotary laser devices 151a and 151b is also known. Accordingly, a height (A+L) of the light-emitting section 131b of the other rotary laser device 151b is known.

According to the present invention, intersecting angles between any one of lines connecting each of the light-emitting sections 131a and 131b and the light-receiving section 156 of the light-receiving sensor 154 and a horizontal reference line 18, that is, an elevation angle β between the horizontal reference line 18 passing the light-emitting section 131a of one rotary laser device 151a and a line 19 passing the light-emitting section 131a and the light-receiving section 156 and a depression angle α between the horizontal reference line 16 passing the light-emitting section 131b of the other rotary laser device 151b and a line 17 passing the light-emitting section 131b and the light-receiving section 156 are measured. The height of the light-receiving section 156 of the light-receiving sensor 154 is determined based on the above intersecting angles α, β and the known heights A and L.

Figure 2:
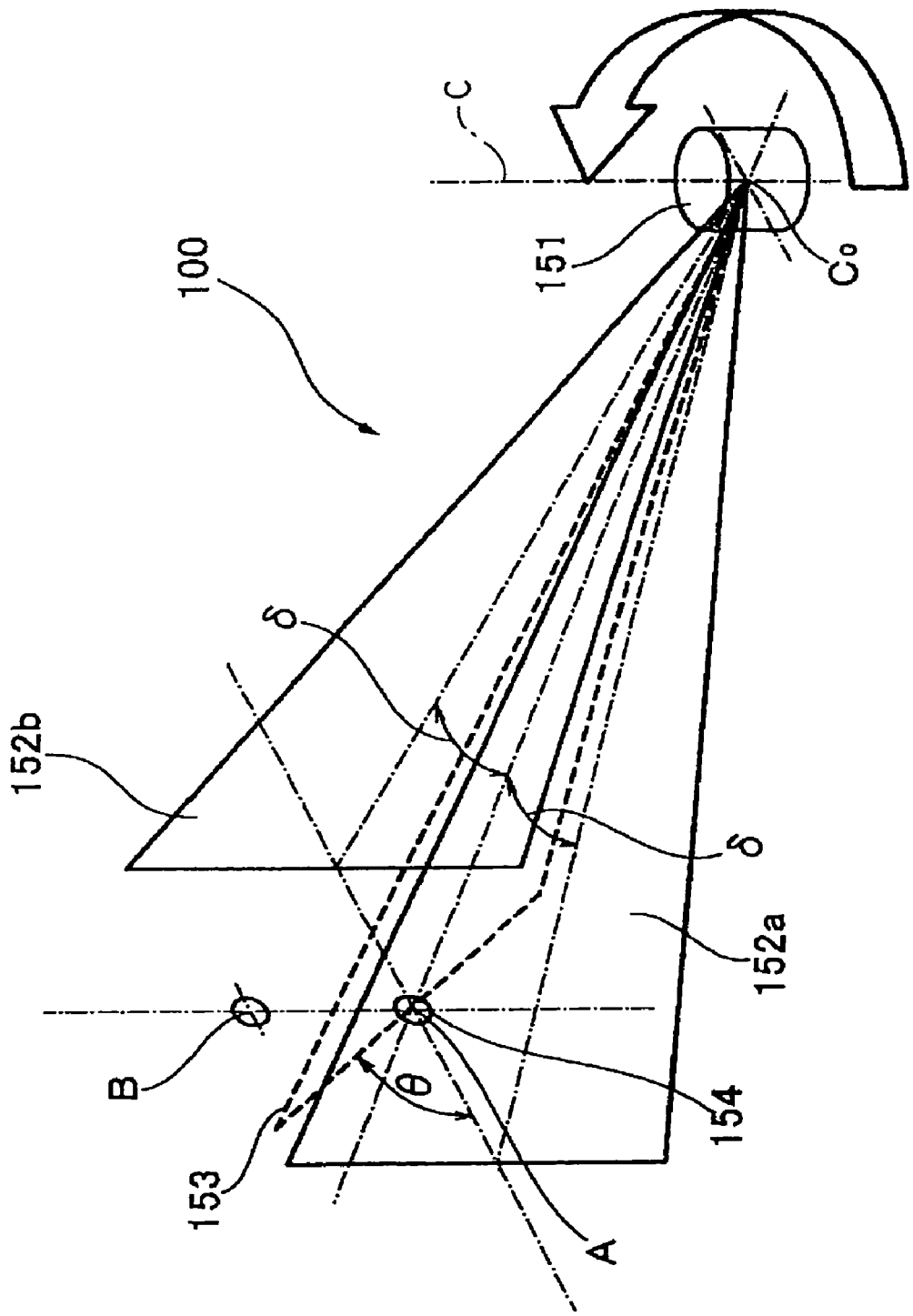
FIG. 2 is a perspective view for illustrating an angle-measuring principle of the height-measuring system according to the present invention.

Before explaining this embodiment in detail, a principle for determining each of the intersecting angles α, β in connection with the fundamental construction of each of the rotary laser devices 151 (151a and 151b) and the light-receiving sensor 154 will be schematically explained along with FIGS. 2 and 3. In FIGS. 2 and 3, the rotary laser device 151 is shown, representing both the rotary laser devices 151a and 151b.

Figure 3A:
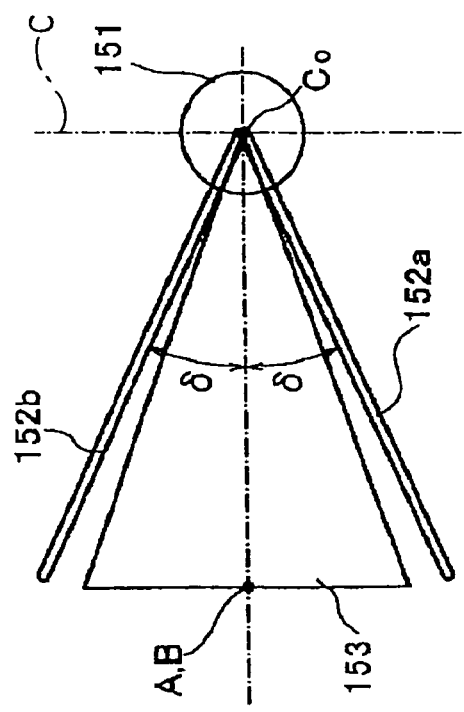
FIGS. 3A, 3B and 3C are a plane view, a front view and a side view of FIG. 2, respectively.
Figure 3B:
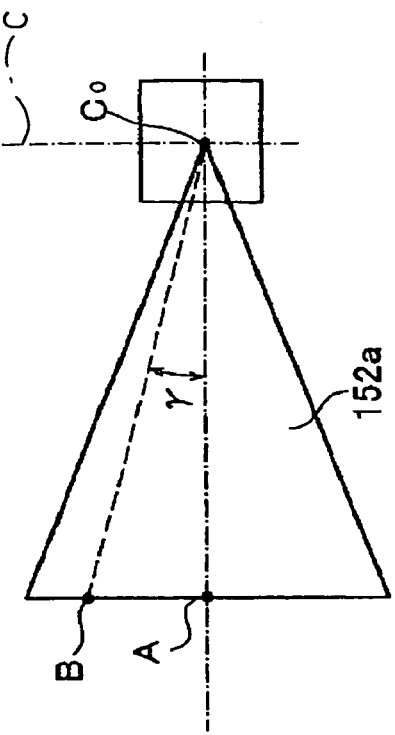
Figure 3C:
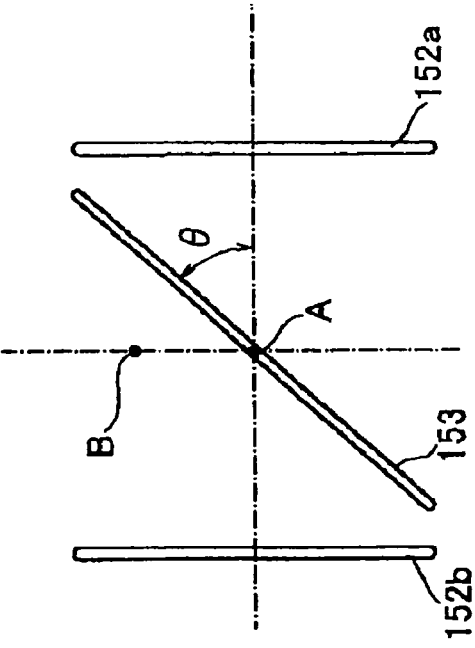

As shown in FIGS. 2 and 3, the rotary laser device 151 emits three fan-shaped laser beams: 152a, 152b and 153, while rotating these fan-shaped laser beams around an axial line C. As clearly shown in FIG. 2 and FIG. 3C, each of the fan-shaped laser beams 152 and 152b is emitted in a direction perpendicular to the horizontal plane, whereas the fan-shaped laser beam 153 is emitted in such a direction as to form an inclined angle ($\pi/2-\theta$) with respect to a perpendicular plane containing the axial line C. As shown in FIG. 3A, the intersecting line between the fan-shaped laser beam153 and the horizontal plane divides the angle between the fan-shaped laser beams 152a and 152b into halve angles. That is, the angle between this intersecting line and the fan-shaped laser beam 152a and that between this intersecting line and the fan-shaped laser beam 152b are equally to $\delta$. Three fan-shaped laser beams 152a, 152b and 153 are rotated in one direction, while maintaining the above relationship. Consequently, the fan-shaped laser beams 152a, 152b and 153 cross the light-receiving sensor 154 with time differences. Based on the time differences, a straight line connecting the light-receiving sensor 154 and the axis point Co as well as an angle y (See FIG. 3B) are determined as mentioned later. This angle, that is, when a perpendicular angle y is determined in relation to one rotary laser device 151a and the light-receiving sensor 154, that angle is the elevation angle $\beta$, whereas when the perpendicular angle y is determined in relation to the other rotary laser device 151b and the light-receiving sensor 154, that angle is the depression angle $\alpha$.

Figure 4:
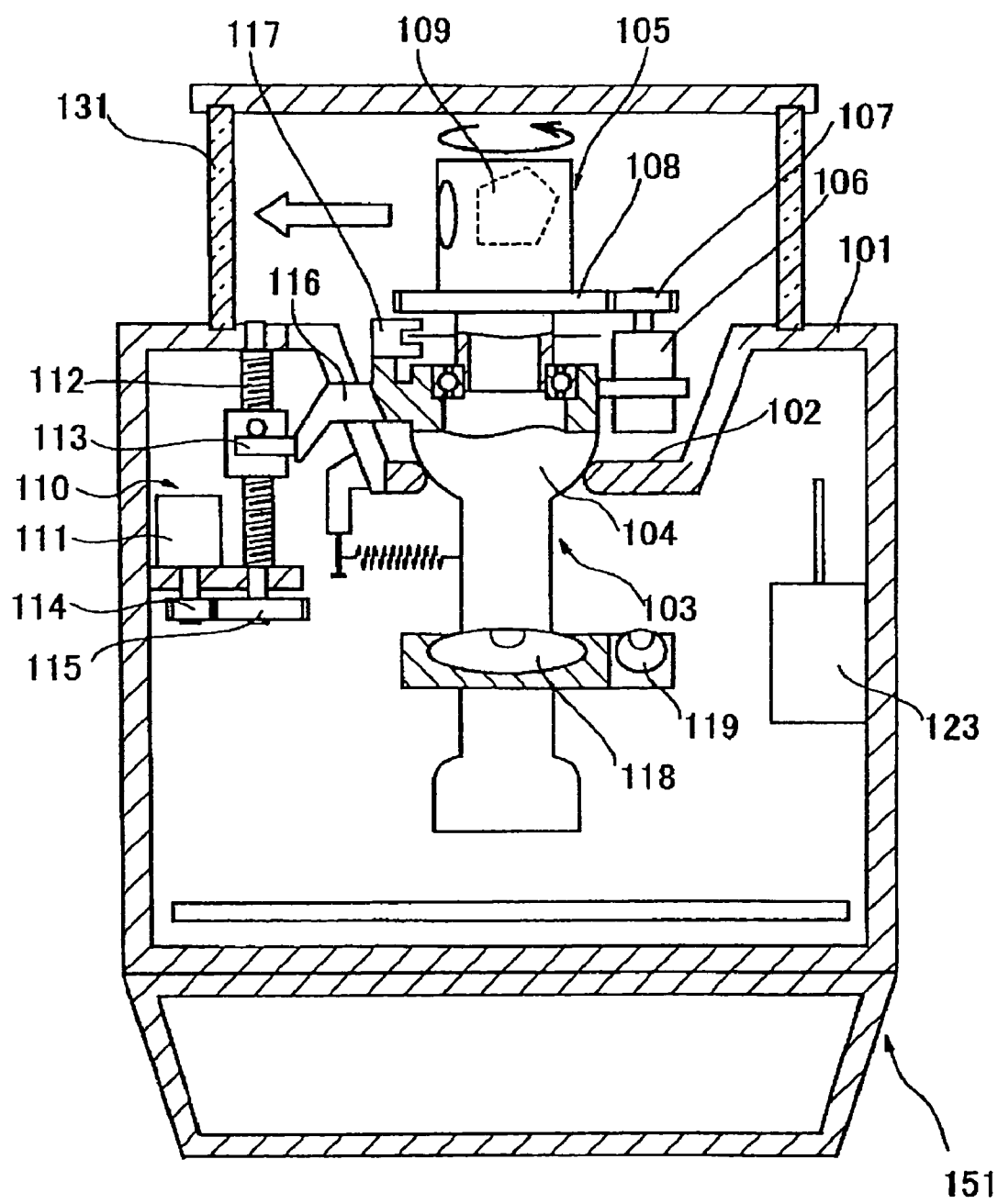
FIG. 4 is a sectional view of a rotary laser device of the height-measuring system shown in FIG. 1.

Next, explanation will be made on the rotary laser device that rotates around the axis line C while emitting three fan-shaped laser beams. FIG. 4 shows the rotary laser device 151 representing the rotary laser devices 151a and 151b. The rotary laser device 151 comprises a casing 101 and a laser projector 103. A depression 102 having an inverse frusto-conical shape is formed in a central portion of an upper face of the casing 101. The laser projector 103 perpendicularly passes a central portion of the depression 102. The laser projector 103 is supported at the depression 102 via a semispherical seat 104 so that the projector may be inclined. A rotary section 105 having a pentagon-shaped prism is rotatably provided at a head portion of the laser projector 103. The rotary section 105 is rotated by a scanning motor 106 via a driving gear 107 and a scanning gear 108.

The rotary laser device 151 comprises two sets of inclining mechanisms provided around the laser projector 103 (only one of these inclining mechanisms is shown). One inclining mechanism 110 comprises an inclining motor 111, an inclining screw 112 and an inclining nut 113. As the inclining motor 111 rotates the inclining screw 112 via a driving gear 114 and an inclining gear 115, the inclining nut 113 is perpendicularly moved through the rotation of the inclining screw 112. The inclining nut 113 is connected to the laser projector 103 via an inclining arm 116. Therefore, when the inclining nut 113 is perpendicularly moved, the laser projector 103 is inclined accordingly. The other inclining mechanism not shown inclines the projector 103 in a direction orthogonal to the direction of inclining the inclining mechanism 110 through a similar mechanism to that of the inclining mechanism 110.

Stationary inclination sensor 118 and 119 are provided in a middle portion of the laser projector 103. The inclination sensor 118 is in parallel to the inclining arm 116, whereas the inclination sensor 119 is arranged in a direction orthogonal to the inclining arm 116. Controlling may be made such that the stationary inclination sensor 118 may always be placed horizontally by inclining the inclining arm 116 with the inclining mechanism 110. Further, simultaneously with this, controlling may be made such that the stationary inclination sensor 119 may be always in a horizontal posture with the other inclining mechanism. By such controlling, the rotary axis of the rotary section 105 may be aligned with the perpendicular axis C. In order to accurately align the above rotary axis with the axial line C, the inclining mechanisms had better be operated, while the rotary laser devices themselves are horizontally installed as much as possible.

Figure 5:
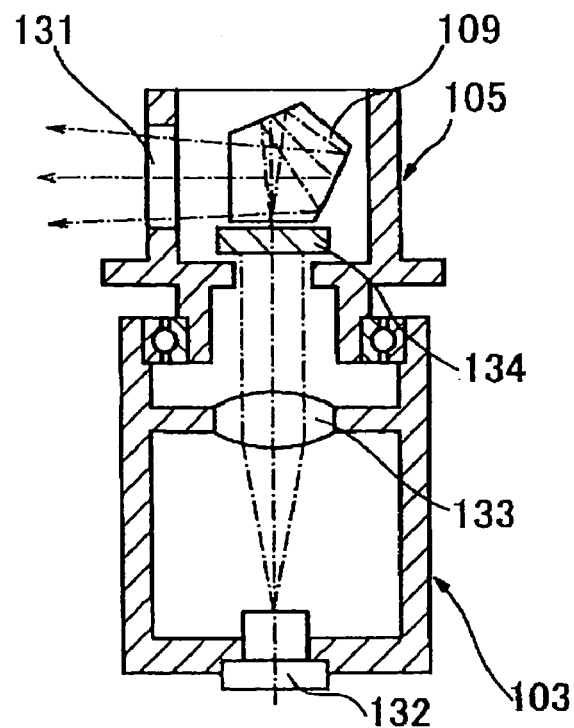
FIG. 5 is a sectional view of an optical system of the rotary laser device shown in FIG. 4.

Next, the laser projector 103 and the rotary section 105 attached to the projector 103 will be explained. As shown in FIG. 5, a projection optical system including a laser beam projector 132, a collimator lens 133 for converting laser beams from the laser projector 132 into parallel beams, etc. is housed inside the laser projector 103. The laser beam from the projection optical system is split into the three fan-shaped laser beams 152a, 152b and 153 with a diffraction lattice (BOE) 134 at the rotary section 105 as shown in FIG. 2 and FIGS. 3A to 3C. The fan-shaped laser beams 152a, 152b and 153 are biased in horizontal directions with the pentagonal prism 109, and are irradiated through a projecting window 131 which functions as a light emitting section of the rotary laser device 151.

Three fan-shaped laser beams 152a, 152b and 153 from each of the rotary laser devices 151a, 151b are detected with the light-receiving sensor 154. In order to prevent overlapped receipt of the laser beams from the rotary laser devices 151a and 151b by the light-receiving sensor with lapse of time, for example, the rotary laser devices 151a and 151b are synchronizingly rotated with a certain lag by wired or wireless connection, optical communication or the like such that the laser beams from the rotary laser devices 151a and 151b may be rotated in a diametrically arrayed state with respect to the axial direction C.

Figure 6:
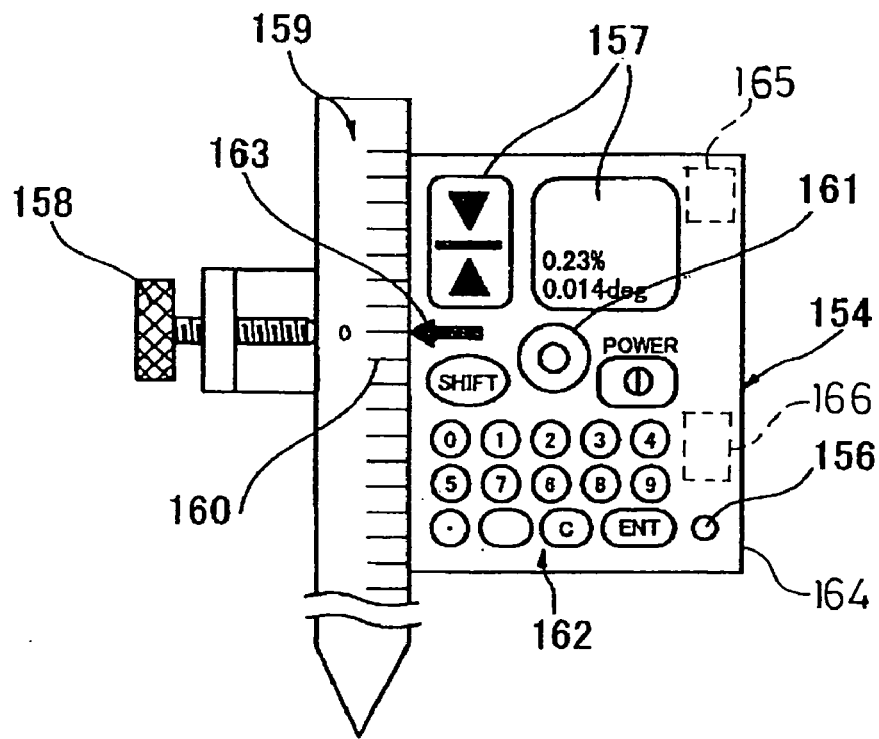
FIG. 6 is an outer appearance view of a light-receiving sensor of the height-measuring system shown in FIG. 1.

Now, the light-receiving sensor 154 which receives the laser beams from each of the rotary laser devices 151a and 151b with time lag will be explained. As shown in FIG. 6, a casing 164 of the light-receiving sensor 154 is provided with a light-receiving section 156 for detecting the fan-shaped laser beams 152a, 152b and 153 from each of the rotary laser devices 151a and 151b. The casing 164 is provided with a display unit 157, an alert section 161 such as a buzzer, an input key 162, a pointer 163 and a scale 159 with graduations 150. A memory section 165 and an arithmetic section 166 are placed inside the casing 164. The casing 164 is adjustably located on the scale 159 with a fixing knob 158.

In the display unit 157, the angles $\alpha$ and $\beta$ which are each formed between the horizontal reference line and a line extending from the point Co of the rotary axis C of the laser beam to the light-receiving section 156 are displayed. A desired height data value inputted by operating the input key 162 is displayed in the display unit 157, and the input data value is stored in the memory section 165.

As mentioned above, each of the rotary laser devices 151 (151a and 151b) emits the fan-shaped laser beams 152a, 152b and 153 while rotating them around the common axis C. As shown in FIG. 3C, the fan-shaped laser beam 153 is emitted, forming the angle $\theta$ with respect to the horizontal plane. Further, as shown in FIG. 3A, an angle 2$\delta$ is formed between the intersecting line of the fan-shaped laser beam 152a and the horizontal plane and that of the fan-shaped laser beam 152b and the horizontal plane. Since three laser beams 152a, 152b and 153 are rotated, while the above relationship is being maintained among them. Accordingly, the laser beams from each of the rotary laser devices 151 (151a and 151b) cross the light-receiving section 156 of the light-receiving sensor 154 in the order of the fan-shaped laser beams 152a, 153 and 152b with time differences.

Figure 7A:
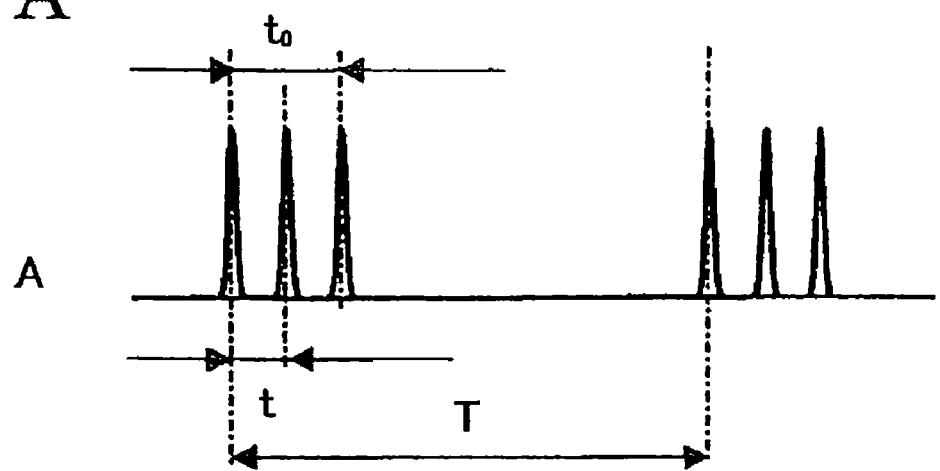
FIG. 7 is a graph showing signals detected with the light-receiving sensor.
Figure 7B:
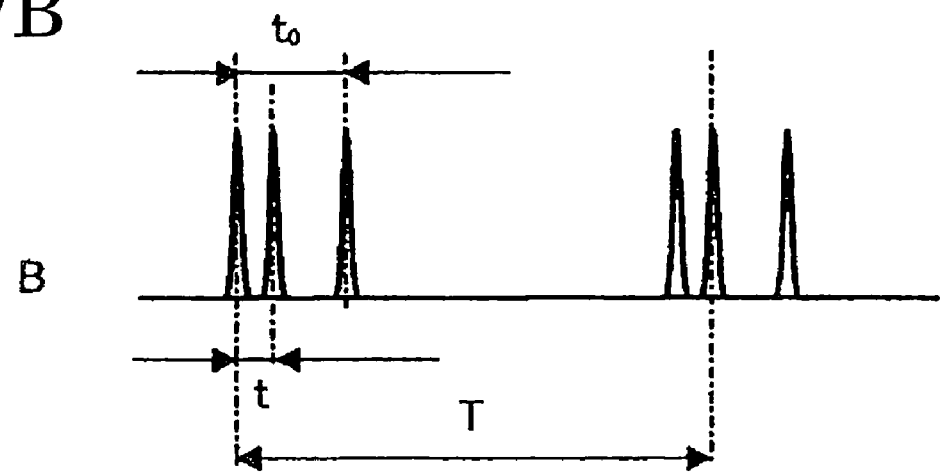

As shown in FIG. 2, when the light-receiving section 156 of the light-receiving sensor 154 is located in a position A of the horizontal plane passing the rotary laser device 151, the laser beams detected with the light-receiving sensor 154 are as shown in FIG. 7A. On the other hand, when the light-receiving section 156 is 0 located at a position B perpendicularly above the position A in FIG. 2, the fan-shaped laser beams detected are as shown in FIG. 7B. As shown in FIG. 7A, the time interval from the detection of the fan-shaped laser beam 152a to the detection of the fan-shaped laser beam 152b is taken as "to". On the other hand, the time interval from the detection of the fan-shaped laser beam 152a to the detection of the fan-shaped laser beam 153 is taken as "t". When the light-receiving section 156 is located at the position A of the horizontal plane, the time interval "t" is equal to a half of the time interval "to". That is, the following equation (1) is met. Meanwhile, a rotation cycle at which the rotary laser device 151 makes one turn of the fan-shaped laser beam is taken as "T".

$$to = 2t \quad (1)$$

Further, as shown in FIG. 2, when the light-receiving section 156 is located at the position B above said horizontal plane, the detection time interval "t" is shorter than the half of "to" as shown in FIG. 7B. As the light-receiving section 156 goes farther upward from the horizontal plane, the detection time interval "t" becomes shorter. As clearly shown in FIG. 3B, an elevation angle <BCA=y formed between a straight line connecting the position B of the light-receiving section 156 to the light-emitting point Co of the fan-shaped laser beam and the horizontal plane is determined based on the detection time interval "t" according to the following equation.

$$y = \delta(1 - 2t/to)\tan\theta \quad (2)$$

When the light-receiving section 156 is located under the horizontal plane containing the point A, the time interval "t" is longer than the half of the time interval "to". Accordingly, it is possible to discriminate whether the light-receiving section 156 is located on, above or under the above horizontal plane. The equation (2) may be also applied to a case where the light-receiving section 156 is located under the horizontal plane.

Referring to the above, when the light-receiving sensor 154 detects the fan-shaped laser beams 152a, 152b and 153 from one rotary laser device 151a, the arithmetic unit 166 calculates the depression angle a shown in FIG. 1, based on the detection time periods "t" among the laser beams according to the equation (2). Similarly, when the light-receiving sensor 154 detects the fan-shaped laser beams 152a, 152b and 153 from the other rotary laser device 151b, the arithmetic unit 166 calculates the depression angle θ shown in FIG. 1, based on the detection time periods "t" among the laser beams according to the equation (2).

The arithmetic unit 166 determines the height of the light-receiving section 156 of the light-receiving sensor 154 based on the elevation angle α a and the depression angle β as obtained and the known dimensions A and L shown in FIG. 1.

That is, the following equations (3) and (4) are met, in which B is the distance between the light-receiving section 156 and the horizontal reference line 18 passing the light-emitting section 131a of one rotary laser device 151a, and X is the distance between the rotary axis C and the light-receiving section 156.

$$\tan\alpha = (L-B)/X \quad (3)$$

$$\tan\beta = B/X \quad (4)$$

For example, when the X obtained from the equation (4) is assigned to X in the equation (3), the distance X can be deleted from the equation (3), so that the equation (3) can be written as the following equation (5).

$$\tan\alpha = (L/B - 1)/\tan\beta \quad (5)$$

In the equation (5), since the angles α and β are already determined by the arithmetic unit 166 and L is known, the arithmetic unit 166 calculates the distance B from the light-receiving section 156 to the horizontal reference line 18 passing the light-emitting section 131a of one rotary laser device 151a. Depending upon necessity, the value B is displayed in the display unit 157. The arithmetic unit 166 also determines the height H (=A+B) from the ground level GL1 to the light-receiving section 156 of the light-receiving sensor 154 by adding the known height A of the light-receiving section 131a from the ground level GL1 to the value B determined. Then, the height H is displayed as a measured value in the display unit 157.

As mentioned above, a desired value H is inputted into the memory unit 165 by operating the input keyboard 162, the arithmetic unit 166 compares the thus stored desired value H with the measured values when the light-receiving sensor 154 is perpendicularly moved, and the buzzer 161 can be operated as an alarming means if the measured value is in conformity with the desired or set value H. In this case, a man can easily grasp through the alarming sound of the buzzer 161 that the light-receiving section 156 of the light-receiving sensor 154 is located at the desired height H.

Further, when the arithmetic unit 166 assigns the calculated distance B into the equation (3) or (4), it can determine the distance X between the rotary axis C and the light-receiving section 156. The measured value X can be also displayed in the display unit 157.

Embodiment 2

Figure 8:
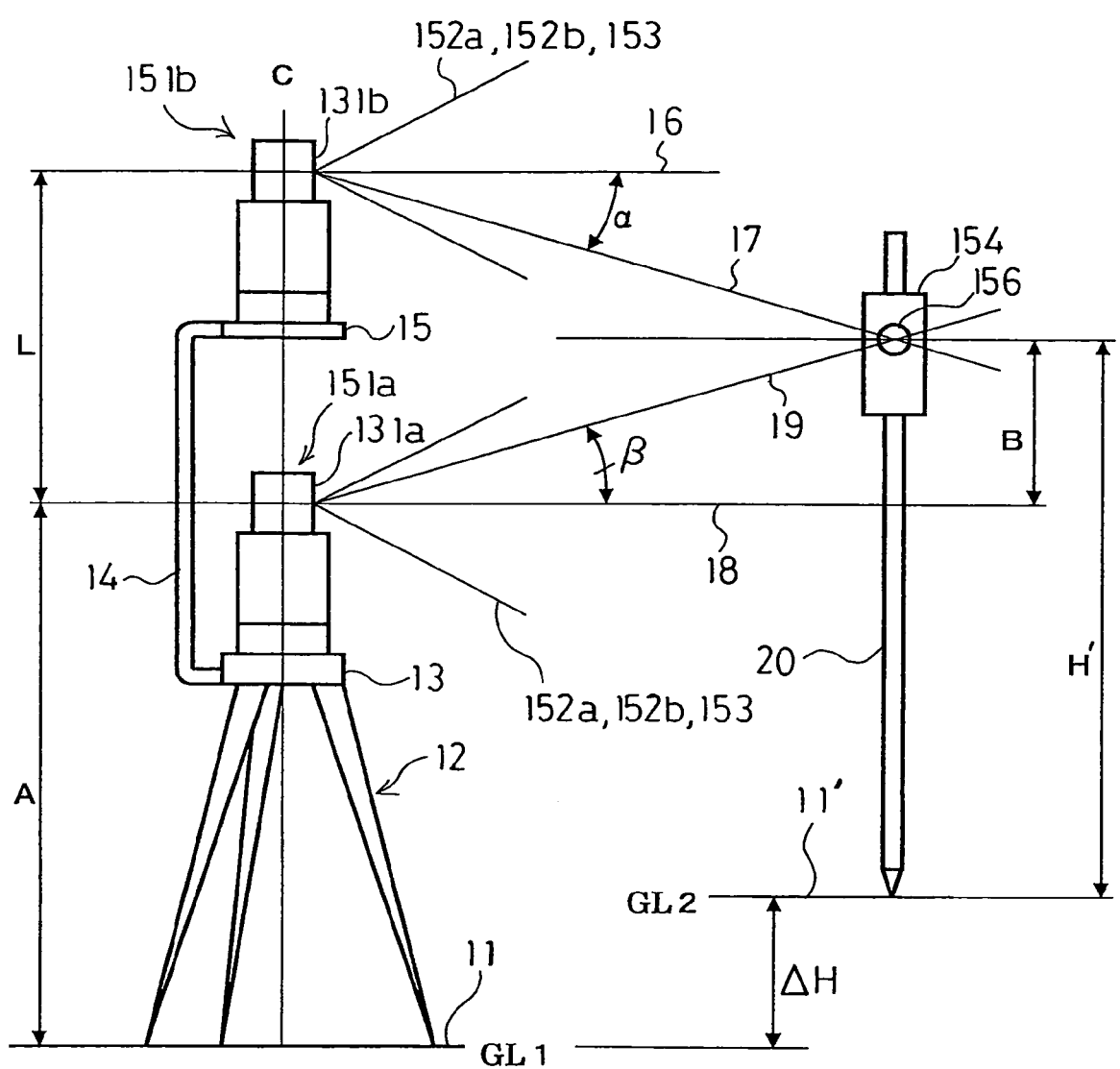
FIG. 8 is a view illustrating an outer appearance view of a second embodiment of the height-measuring system according to the present invention as in FIG. 1.

In a measuring system 110 shown in FIG. 8, a support pole 20 is perpendicularly installed on the ground 11', and the casing 164 (See FIG. 6) of the light-receiving sensor 154 is perpendicularly movably held at the support pole 20. The light-receiving sensor 154 can be located at a desired height of the support pole 20 by tightening a fixing knob 158 similar to that as shown in FIG. 6. The support pole 20 is provided with graduations 160 indicating the height H from the ground 11' with the indication of the pointer 163 as shown in FIG. 6.

The arithmetic section 166 of the light-receiving section 154 reads an indicated value H' of the pointer 163, and stores it in the memory section 165 similar to that as mentioned above.

The arithmetic unit 166 calculates the height H of the light-receiving section 156 from the ground 11 above which the rotary laser devices 151a and 151b are installed, and subtracts the indicating value H' stored in the memory section 165 from this height H. A level difference ΔH is calculated by this subtraction (H−H'), ΔH being the level difference between the ground level GL1 of the ground 11 above which the rotary laser devices 151a and 151b are arranged and the ground level GL2 of the ground 11' at which the support pole 20 to be fitted with the light-receiving sensor 154 is installed. This level difference ΔH can be displayed in the display unit 157.

Embodiment 3

Figure 9:
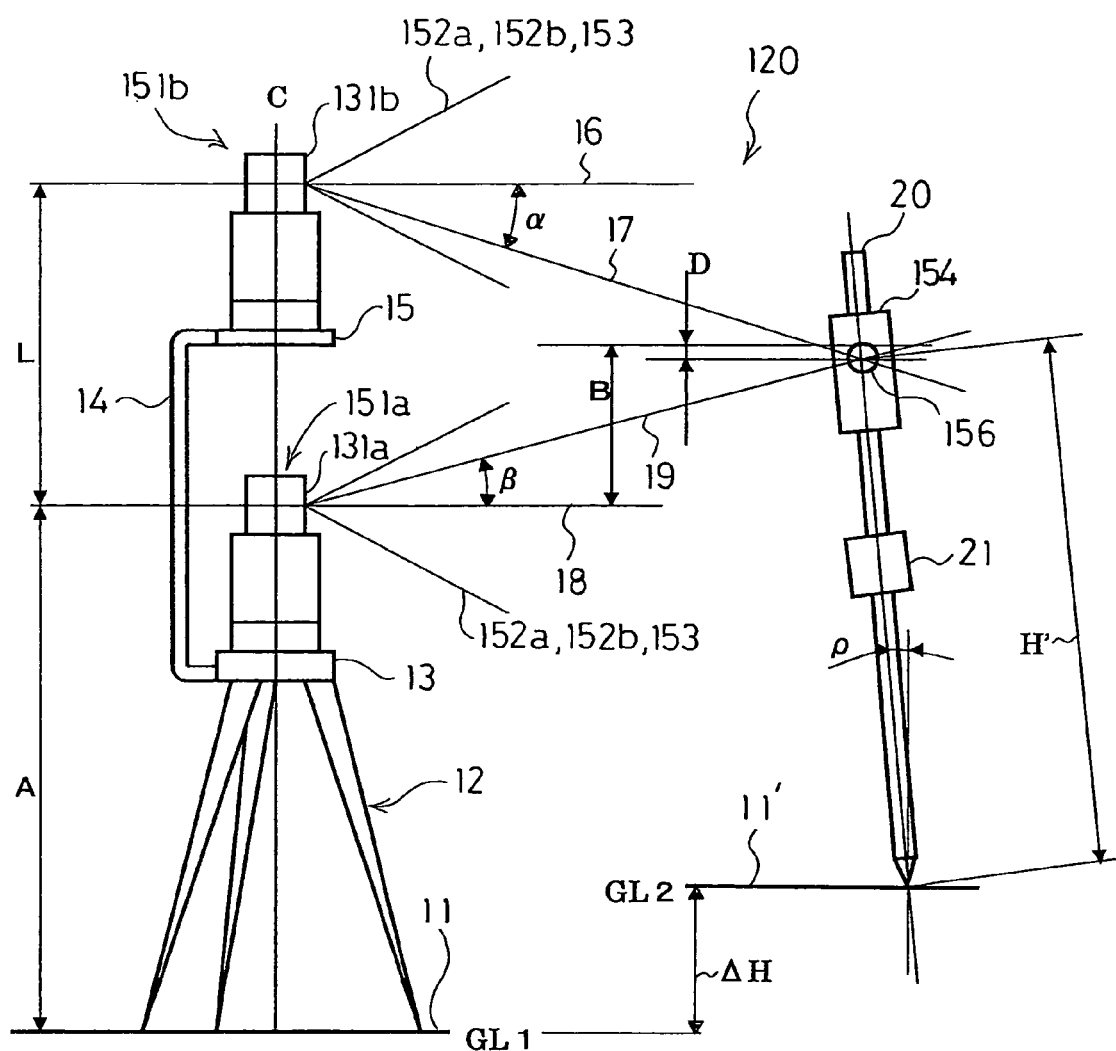
FIG. 9 is a view illustrating an outer appearance view of a third embodiment the height-measuring system according to the present invention as in FIG. 1.

As shown with a measuring system 120 of FIG. 9, an inclination detector 21 is arranged at the support pole 20. In the measuring system 120 with this inclination detector 21, if the support pole 20 to which is fitted the light-receiving sensor 154 is inclined to the perpendicular line to the ground 11', an electric signal corresponding to the inclination ρ of the support pole 20 relative to the perpendicular line is outputted to the arithmetic unit 166.

If there occurs the inclination ρ, the distance B of the light-receiving section 156 from the horizontal reference line 18 passing the light-emitting section 131a of one rotary laser device 151a as calculated by the arithmetic unit 166 contains an error D corresponding to the inclination ρ. However, if the arithmetic unit 166 receives an error signal corresponding to the inclination ρ from the inclination detector 21, the arithmetic unit 166 calculates an appropriately corrected value B by adding a correcting value corresponding to the inclination ρ to the calculated value B so as to remove the error D. This correction produces the corrected height H' of the light-receiving section 156 from the ground 11'. Therefore, the accurate height H of the light-receiving section 156 from the ground level GL1 of the ground 11 and the accurate level difference (H−H') between the ground level GL1 of the ground 11 and the ground level GL2 of the ground 11' can be determined by using the appropriate values B and H' corrected, irrespective of the inclination p of the supporting pole.

Embodiment 4

Figure 10:
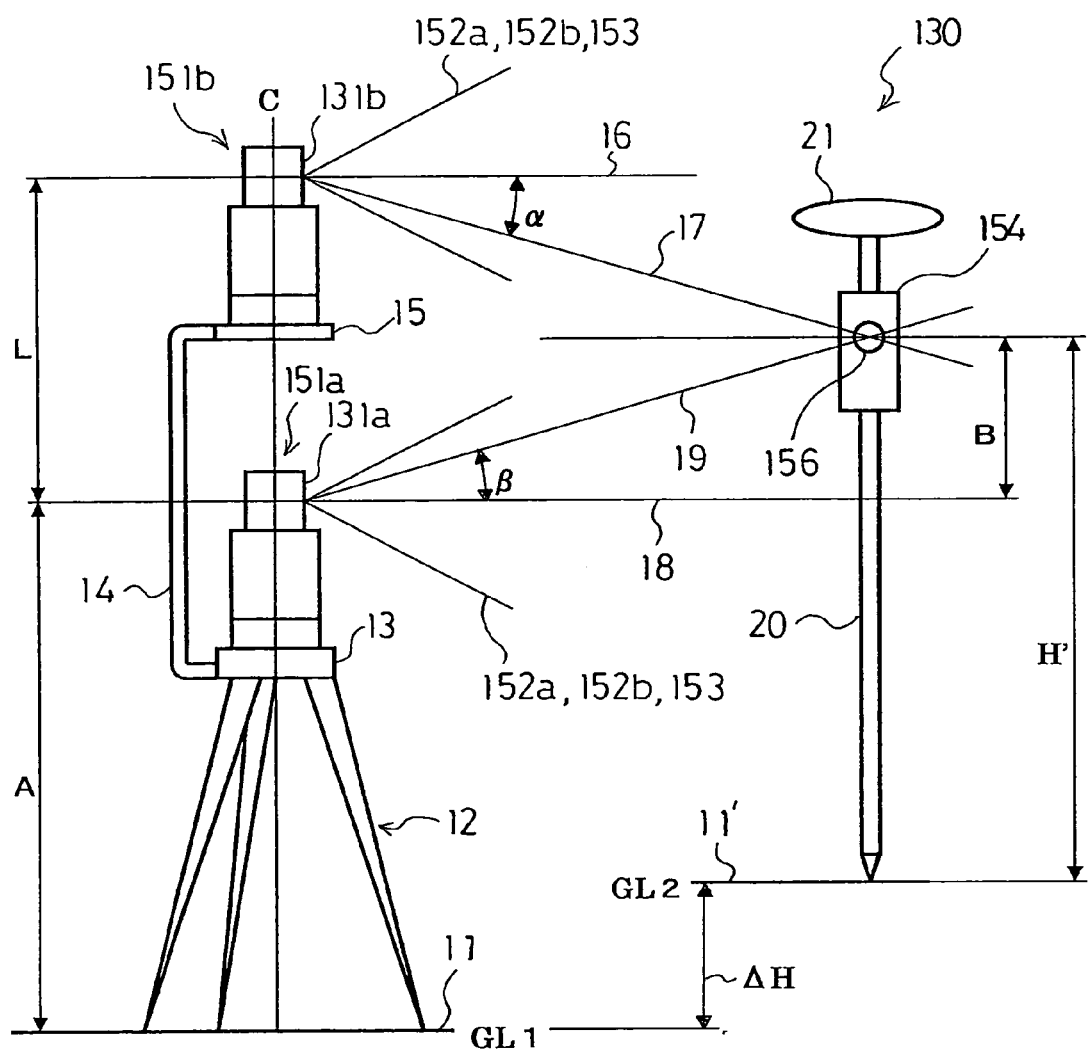
FIG. 10 is a view illustrating an outer appearance of a fourth embodiment the height-measuring system according to the present invention as in FIG. 1.

As shown in a measuring system 130 of FIG. 10, a GPS (Global Positioning System) can be utilized to determine the absolute position of the support pole 20 or that of the light-receiving sensor 154. A GPS antenna 21 is attached to a top portion of the support pole 20. A GPS main body (not shown) is provided inside the casing 165 of the light-receiving sensor 154 shown in FIG. 6. The GPS main body is adapted to calculate the absolute position based on a GPS signal received by the GPS antenna 21 from a satellite. The positional information obtained by the GPS can be displayed in the display unit 157 as the displaying means.

The absolute position obtained by the GPS can be corrected by correlating the position of the rotary laser device and the data of the emitting directions of the laser beam with the inclining direction of the inclination detector 21. For example, a right-angle coordinate system can be used therefor. Data can be transmitted by optical communication or the like.

As mentioned above, the absolute value can be measured at a high precision by utilizing the GPS in the measurement of the absolute value of the light-receiving sensor 154. The measuring work can be readily performed at high accuracy in combination with the above-mentioned height measurement of H and ΔH with the light-receiving sensor 154.

The light-receiving sensor 154 receives the laser beams from rotary laser device 151b for the determination of the depression angle α and the laser beams from rotary laser device 151a for the determination of the elevation angle β with the time lag. Thus, the light-receiving section 156 of the light-receiving sensor 154 never detects both the laser beams simultaneously in an overlapped manner, which prevents erroneous operation or erroneous measurement due to the overlapping. In order to more assuredly prevent such erroneous working, it is preferable to use mutually discriminative laser beams as those from the rotary laser devices 151a and 151b, respectively.

For this reason, polarized laser beams having different polarized directions and thus different polarized planes can be used as the laser beams from the rotary laser devices 151a, 151b, respectively. Instead of using the laser beams having different polarized directions, one of the laser beams can be modulated, or the wavelengths of two laser beams can be made different from each other.

In the above, an example in which both the rotary laser devices 151a and 151b are rotated over an angular range of 0 to 350 degrees in one direction is given. Instead of this, the rotary laser devices can be turned to-and-fro in a reciprocating manner to scan a predetermined angular range to irradiate and scan the light-receiving sensor 154.

Further, explanation has been made on the case by way of example where the fan-shaped laser beams comprise a pair of the perpendicular fan-shaped laser beams 152a and 152b and the inclined fan-shaped laser beam 153. For example, however, either one of the perpendicular laser beams 152a and 152b may be omitted. Further, variously combined variations of the laser beams shown in FIG. 23 of JP-A 2002-39755 may be used. JP-A 2002-39755 is incorporated hereinto by reference.

What is claimed is:

1. A method for measuring a height or a relative position in an axial direction, said method comprising the steps of:
    vertically arranging a pair of rotary laser devices, aligning respective axes of said pair of rotary laser devices into a single axis and keeping said rotary laser devices away from each other in an axial direction thereof by a predetermined interval;
    arranging a light-receiving sensor, keeping said sensor radially away from said single axis;
    emitting a plurality of fan-shaped laser beams from each of the rotary laser devices while rotating said laser beams, said laser beams comprising at least one fan-shaped laser beam inclined to a plane containing said single axis;
    receiving and detecting the laser beams with the light-receiving sensor;
    determining inclinations of the rotary laser devices relative to the light-receiving sensor, respectively, based on time intervals of said detection of the laser beams; and
    detecting the position of the sensor relative to said pair of rotary laser devices in the axial direction.

2. The height-measuring method set forth in claim 1, wherein said plurality of fan-shaped laser beams are emitted from a light-emitting section of each of the rotary laser devices while said rotation of said pair of rotary laser devices around said single axis is so performed that said plurality of laser beams from each of the rotary laser devices scan a predetermined angular range around said single axis, said plurality of laser beams from each of the rotary laser devices are received and detected by a light-receiving section of the light-receiving sensor with time lags, intersecting angles between a horizontal reference plane and lines connecting the respective light-emitting sections to the light-receiving section are determined based on the detection time intervals with respect to the respective light-emitting sections, and a height of the light-receiving section from a ground level above which the rotary laser devices are arranged is determined based on said intersecting angles and information of heights of the respective rotary laser devices from the ground level.

3. The height-measuring method set forth in claim 2, wherein said light-receiving sensor is arranged on a support pole installed on a ground, and a level difference between said ground level and the ground on which is installed the support pole is calculated based on additional information of known height of said light-receiving section from the ground and information of determined height of the light-receiving-section from the ground above which the rotary laser devices are placed.

4. The height-measuring method set forth in claim 3, wherein said support pole is provided with an inclination detector adapted to detect an inclination of the support pole to a perpendicular line within a plane containing the support pole and the rotary laser devices, and said height or said level difference from said ground level above which the rotary laser devices are placed is corrected based on an inclination detection signal from the inclination detector.

5. The height-measuring method set forth in claim 1, wherein a polarized direction of the laser beams from one of the rotary laser devices is different from a polarized direction of the laser beams from the other, to discriminate the laser beams of one of the rotary laser devices from the laser beams of the other.

6. The height-measuring method set forth in claim 1, wherein the laser beams from at least one of the rotary laser devices are modulated to discriminate the laser beams of one of the rotary laser devices from the laser beams of the other.

7. The height-measuring method set forth in claim 1, wherein wavelength of the laser beams from one of the rotary laser devices is different from wavelength of the laser beams from the other, to discriminate the laser beams of one of the rotary laser devices from the laser beams of the other.

8. The height-measuring method set forth in claim 1, wherein a GPS (Global Positioning System) to detect an absolute position of the light-receiving sensor is mounted on the light-receiving sensor, and the absolute position determined by the GPS is displayed.

9. A system for measuring a height or position in an axial direction, said system comprising
a pair of rotary laser devices vertically arranged with respective axes of said pair of rotary laser devices being aligned into a single axis and said rotary laser devices being kept away from each other in an axial direction thereof by a predetermined interval; and
a light-receiving sensor arranged so that said sensor is kept radially away from said single axis, wherein
a plurality of fan-shaped laser beams are emitted from each of the rotary laser devices while said pair of the rotary laser devices are rotated around said single axis, said plurality of laser beams comprise at least one fan-shaped laser beam in a plane inclined to a plane containing said single axis,
the light-receiving section receives and detects said laser beams,
inclinations of the rotary laser devices are detected relative to the light-receiving sensor, respectively, based on time intervals of said detection of the laser beams, and
the position of the sensor is detected relative to said pair of rotary laser devices in the axial direction.

10. The height-measuring system set forth in claim 9, wherein based on the detection of the inclinations of the rotary laser devices, distances of the light-receiving sensor from the rotary laser devices, as well as the relative position of the light-receiving sensor in the axial direction to said pair of rotary laser devices, is calculated.

11. The height-measuring system set forth in claim 10, wherein a polarized direction of the laser beams from one of the rotary laser devices is different from a polarized direction of the laser beams from the other, to discriminate the laser beams of one of the rotary laser devices from the laser beams of the other.

12. The height-measuring system set forth in claim 10, wherein the laser beams from at least one of the rotary laser devices are modulated to discriminate said laser beams from one of the rotary laser devices from the laser beams of the other.

13. The height-measuring system set forth in claim 10, wherein wavelength of the laser beams from one of the rotary laser devices is different from wavelength of the laser beams from the other to discriminate the laser beams of one of the rotary laser devices from the laser beams of the other.

14. The height-measuring system set forth in claim 9, wherein
each of the rotary laser devices comprises a light-emitting section to emit said plurality of fan-shaped laser beams while said rotation of said pair of rotary laser devices around said single axis is so performed that said plurality of laser beams from each of the rotary laser devices scan a predetermined angular range around said single axis,
the light-receiving sensor comprises a light-receiving section to receive and detect said plurality of laser beams from each of the rotary laser devices with time lags,
the height-measuring system further comprises an arithmetic unit,
respective heights of the light-emitting sections from a ground level above which the rotary laser devices are installed are different from each other,
the laser beams from one light-emitting section are discriminative from the laser beams from the other light-emitting section,
the light-receiving sensor determines intersecting angles between a horizontal reference plane and lines connecting the respective light-emitting sections to the light-receiving section based on detection information of the respectively discriminative laser beams emitted from the respective rotary laser devices, and
the arithmetic unit determines the heights of the light-receiving sections from the ground level based on information of said intersecting angles and respectively known heights of the light-receiving sections.

15. The height-measuring system set forth in claim 14, which further comprises a setter for setting a desired height for said light-receiving sensor, and a display unit for making a display when the determined height of the light-receiving sensor from said ground level is in conformity with said desired value.

16. The height-measuring system set forth in claim 14, which comprises a support pole on which said light-receiving sensor is placed and which is installed on a ground, and wherein said arithmetic unit calculates a difference in level between the ground level on which the rotary laser devices are installed and the ground on which the pole is placed, based on information of known height of the light-receiving section from the ground level on which the pole is installed and the determined height of the light-receiving section from the ground level above which the rotary laser devices are installed.

17. The height-measuring method set forth in claim 16, wherein said support pole is provided with an inclination detector adapted to detect an inclination of the support pole to a perpendicular line within a plane containing the support pole and the rotary laser devices, and the arithmetic unit corrects said height of the light-receiving section from the ground level above which the rotary laser devices are installed or said level difference is based on an inclination detection signal from the inclination detector.

18. The height-measuring system set forth in claim 14, wherein said light-receiving sensor comprises a GPS (Global Positioning System) for detecting an absolute position of the light-receiving sensor, and the display unit displays the absolute position obtained by the GPS.

* * * * *